(12) United States Patent
Goujon et al.

(10) Patent No.: US 10,112,594 B2
(45) Date of Patent: Oct. 30, 2018

(54) BRAKE CYLINDER PRESSURE MAINTENANCE VALVES FOR FREIGHT CAR BRAKE EQUIPMENT

(71) Applicant: Amsted Rail Company, Inc., Chicago, IL (US)

(72) Inventors: Daniel Goujon, Beaugency (FR); Patrick Adams, Saluda, SC (US); Roberto Correndo, Turin (IT); Mickael Marechal, Hem Hardinval (FR); Daniel Brushwood, Easley, SC (US)

(73) Assignee: Amsted Rail Company, Inc., Chicago, IL (US)

( * ) Notice: Subject to any disclaimer, the term of this patent is extended or adjusted under 35 U.S.C. 154(b) by 283 days.

(21) Appl. No.: 14/862,347

(22) Filed: Sep. 23, 2015

(65) Prior Publication Data

US 2017/0080913 A1 Mar. 23, 2017

(51) Int. Cl.
*B60T 15/18* (2006.01)
*F16K 7/00* (2006.01)
*F16K 15/14* (2006.01)

(52) U.S. Cl.
CPC .............. *B60T 15/184* (2013.01); *F16K 7/00* (2013.01); *F16K 15/14* (2013.01)

(58) Field of Classification Search
CPC ...... B60T 15/184; B60T 15/021; B60T 15/42; F16K 15/14; F16K 7/00
See application file for complete search history.

(56) References Cited

U.S. PATENT DOCUMENTS

| 4,125,294 A | 11/1978 | Cannon |
| 9,108,603 B2 | 8/2015 | Call et al. |
| 2014/0102558 A1 | 4/2014 | Call et al. |
| 2014/0125115 A1 | 5/2014 | Gaughan et al. |
| 2015/0061360 A1 | 3/2015 | Vaughn |

FOREIGN PATENT DOCUMENTS

| DE | 11 95 347 B | 6/1965 |
| WO | WO2013/152006 A1 | 10/2013 |

OTHER PUBLICATIONS

Faiveley Transport North America, Inc., International patent Application No. PCT/US2016/051233; International Search Report; dated Nov. 8, 2016; 5 pages.

*Primary Examiner* — Xuan Lan Nguyen
(74) *Attorney, Agent, or Firm* — Dority & Manning, P.A.

(57) ABSTRACT

Valves for maintaining brake cylinder pressure in freight car brake equipment are provided. A valve includes a first diaphragm defining a first side and a second side, and a second diaphragm defining a first side and a second side. The valve further includes a first port for receiving pressure from one of an emergency reservoir or a control volume, the first port in fluid communication with the first side of the first diaphragm; a second port for receiving pressure from a brake pipe, the second port in fluid communication with the second side of the first diaphragm; and a third port for receiving pressure from a brake cylinder, the third port in fluid communication with the second side of the second diaphragm.

21 Claims, 4 Drawing Sheets

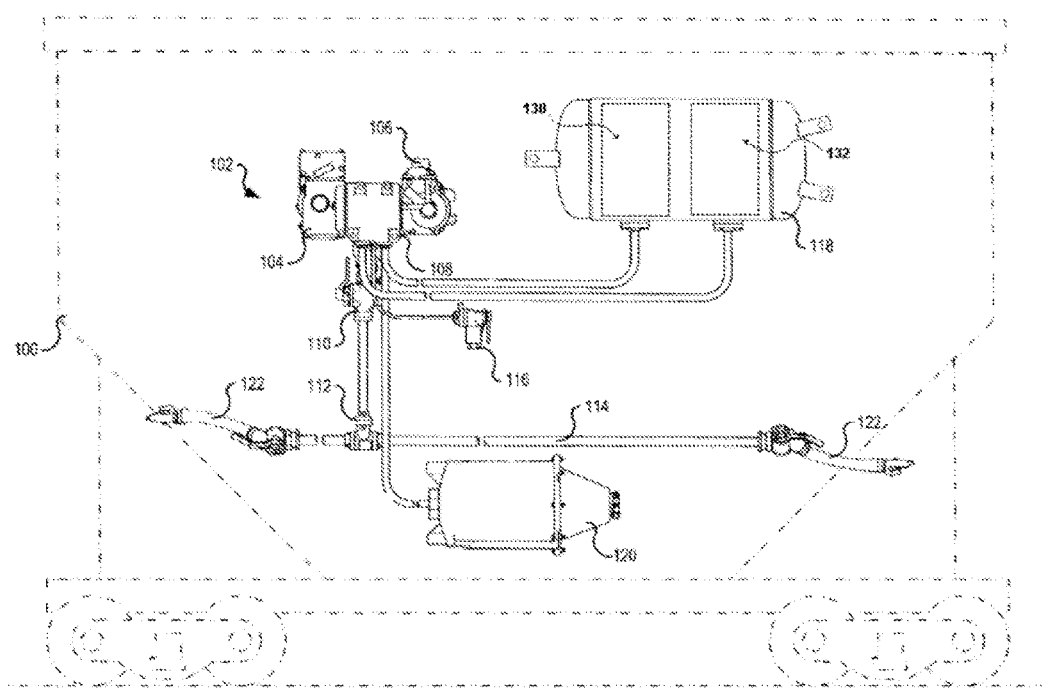
FIG. -1-
PRIOR ART

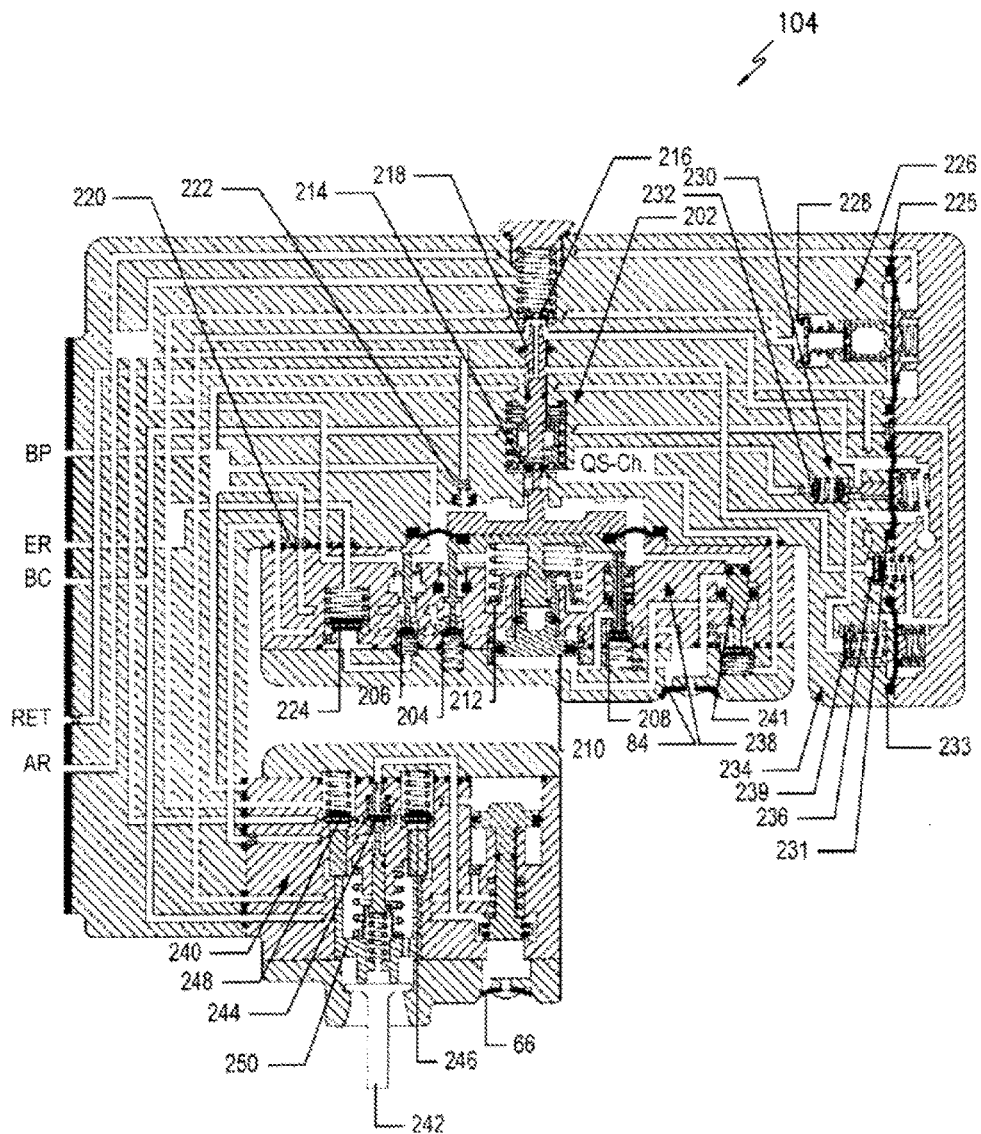
FIG. -2-
PRIOR ART

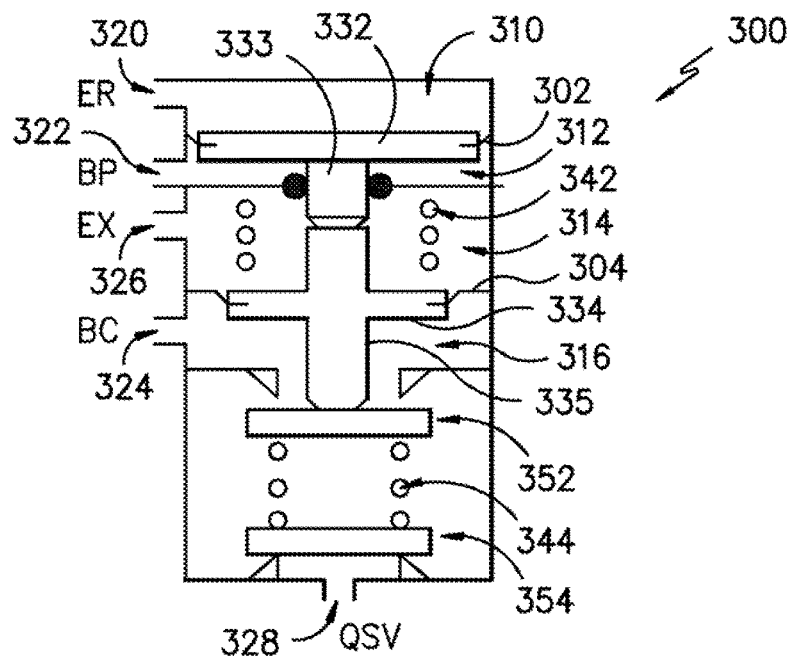
FIG. -3-
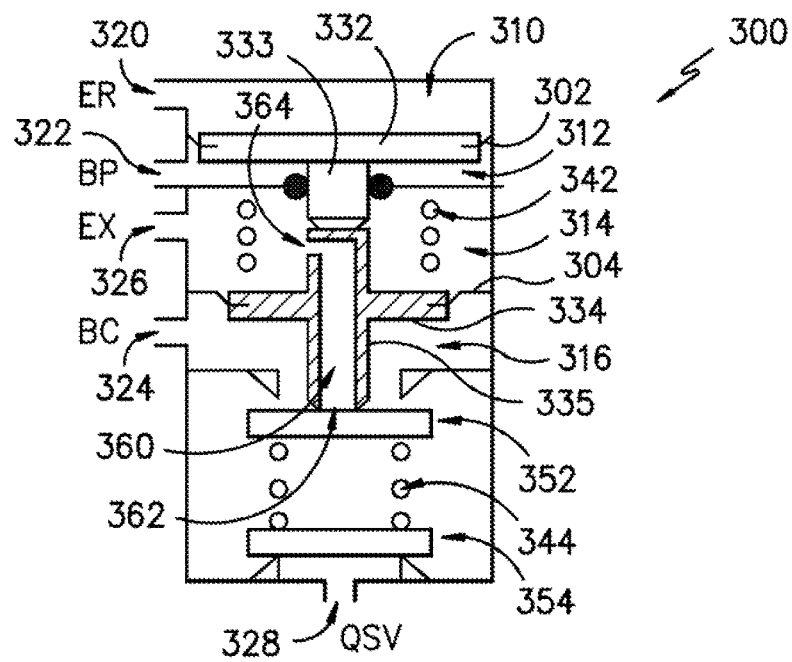
FIG. -4-

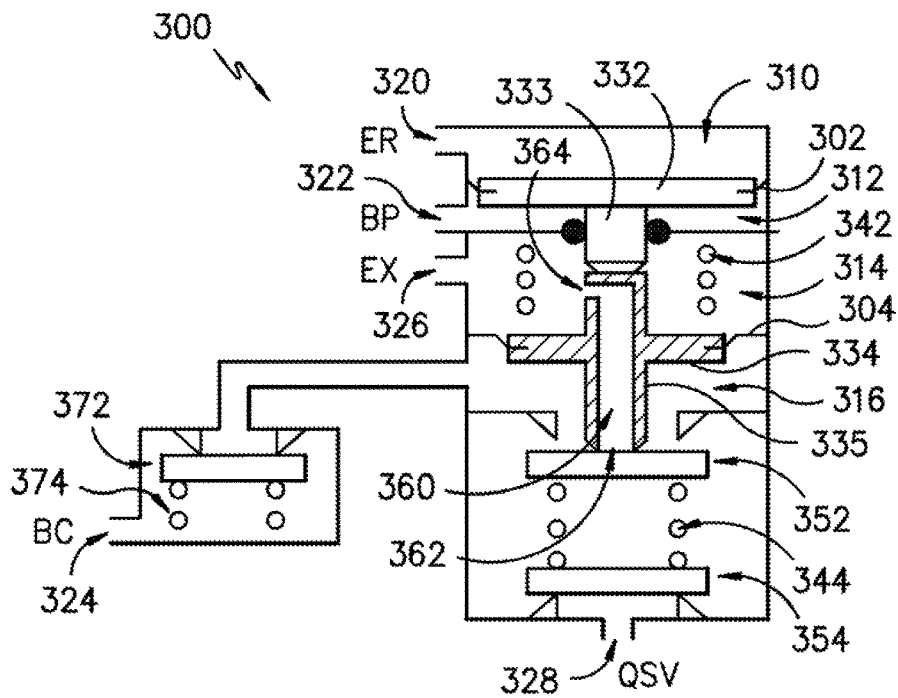
FIG. -5-
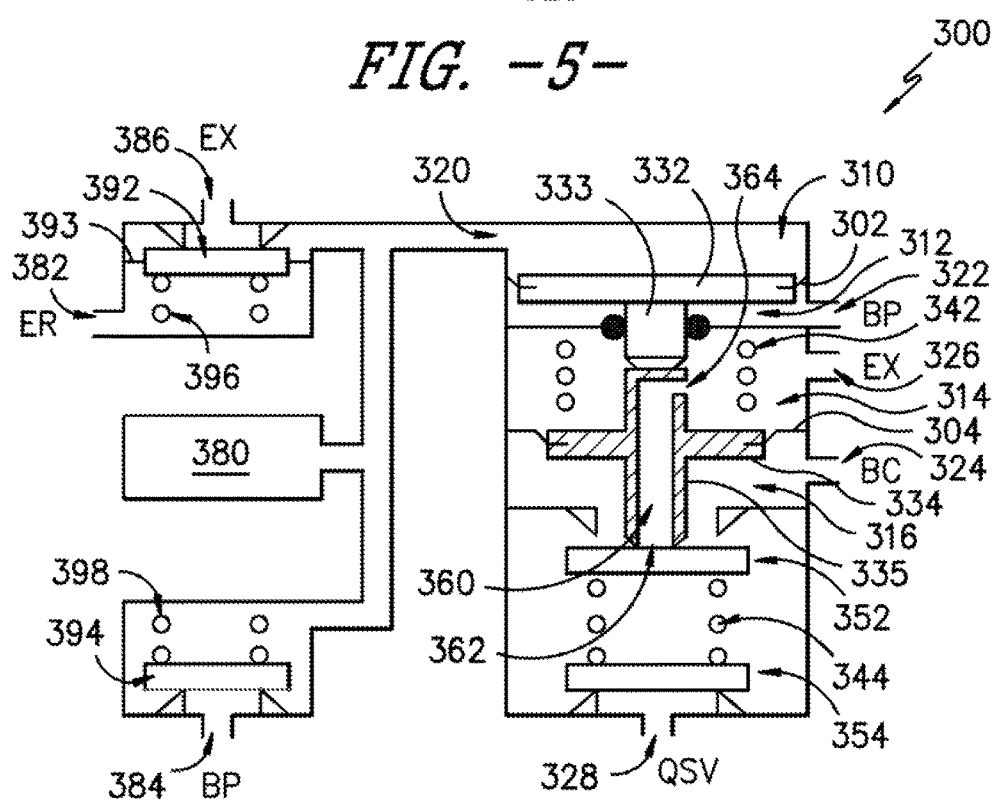
FIG. -6-

BRAKE CYLINDER PRESSURE MAINTENANCE VALVES FOR FREIGHT CAR BRAKE EQUIPMENT

FIELD OF THE INVENTION

The present disclosure relates generally to control valves for use in freight car brake equipment, and more particularly to valves that maintain the brake cylinder pressure in such control valves.

BACKGROUND OF THE INVENTION

Control valves used in freight car brake systems are well known. If such control valves supply air pressure to the brake cylinder of a freight car, and the plumbing between the control valve and the freight car has a leak, then the brake cylinder will not maintain the original set pressure. This could be due to, for example, a leaking packing cup in the brake cylinder, a leaking hose, or any other reason that would lead to the leaking of pressure between the connection of the control valve and the brake cylinder.

Various approaches to resolving this issue are provided in, for example, U.S. Pat. Nos. 4,474,412; 4,493,511; and U.S. Pat. Pub. No. 2015/0061360, all of which are incorporated by reference herein in their entireties. In U.S. Pat. No. 4,474,412, a brake cylinder pressure maintaining valve is connected to a brake pipe, brake cylinder pipe and volume reservoir, as well as to an emergency reservoir. The brake cylinder pressure maintaining valve operates to provide air from the volume reservoir to the brake cylinder pipe and thus the brake cylinders when pressure in the brake cylinder pipe drops below a predetermined level, thus ensuring a minimum brake application pressure, regardless of the piston travel of the brake cylinders.

U.S. Pat. No. 4,493,511 discloses a brake cylinder pressure maintaining valve which, during brake application, takes air from the brake pipe and feeds it into the brake cylinder until it reaches minimum brake pressure. To avoid the need for an extra valve, the brake cylinder pressure maintaining valve is used as a quick service bulb exhaust valve during brake release and means are provided to ensure that the brake cylinder pressure maintaining valve opens immediately on brake release. Once the brakes have been applied, pressure in the brake cylinder is maintained from the quick service bulb. Brake cylinder exhaust pressure taken from a point after the brake cylinder exhaust valve, but before the brake cylinder exhaust choke, is directed to a chamber above the inshot and brake cylinder maintaining valve diaphragm. Since the pressure in a port upstream of the brake cylinder exhaust choke attains a pressure within about 10 psi of the chamber, a spring in another chamber can open the brake cylinder maintaining valve. Thus, immediate opening of brake cylinder maintaining valve occurs when the bi-stable operator moves to the release position. Bulb pressure from a QS bulb is then able to flow via the BC maintaining choke and fall with the fall of brake cylinder pressure.

U.S. Pat. Pub. No. 2015/0061360 discloses a brake cylinder pressure maintaining valve which utilizes an input and output diaphragm as a differential relay for maintaining brake cylinder pressure. The valve utilizes ports connected to an emergency reservoir, auxiliary reservoir and the brake cylinder, and is controlled by a balance of these pressures.

Such prior art approaches to brake cylinder pressure maintenance have disadvantages. For example, the approaches discussed in U.S. Pat. Nos. 4,474,412 and 4,493,511 are relatively complicated and difficult to implement. The approach discussed in U.S. Pat. Pub. No. 2015/0061360 requires the use of both emergency reservoir and auxiliary reservoir pressures, which could potentially be undesirable. Accordingly, improved valves for maintaining brake cylinder pressure are desired.

BRIEF DESCRIPTION OF THE INVENTION

Aspects and advantages of the invention will be set forth in part in the following description, or may be obvious from the description, or may be learned through practice of the invention.

In accordance with one embodiment, a valve for maintaining brake cylinder pressure in freight car brake equipment is disclosed. The valve includes a first diaphragm defining a first side and a second side, and a second diaphragm defining a first side and a second side. The valve further includes a first port for receiving pressure from one of an emergency reservoir or a control volume, the first port in fluid communication with the first side of the first diaphragm; a second port for receiving pressure from a brake pipe, the second port in fluid communication with the second side of the first diaphragm; and a third port for receiving pressure from a brake cylinder, the third port in fluid communication with the second side of the second diaphragm.

In accordance with another embodiment, a freight car brake system is disclosed. The system includes a brake pipe, an auxiliary reservoir, an emergency reservoir, a brake cylinder, and a brake control valve connected to the brake pipe, the auxiliary reservoir, the emergency reservoir, and the brake cylinder, the brake control valve comprising a valve for maintaining brake cylinder pressure. The valve includes a first diaphragm defining a first side and a second side, and a second diaphragm defining a first side and a second side. The valve further includes a first port for receiving pressure from one of the emergency reservoir or a control volume, the first port in fluid communication with the first side of the first diaphragm; a second port for receiving pressure from the brake pipe, the second port in fluid communication with the second side of the first diaphragm; and a third port for receiving pressure from the brake cylinder, the third port in fluid communication with the second side of the second diaphragm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of one embodiment of prior art freight car brake equipment;

FIG. 2 is a diagrammatic view of one embodiment of a service portion of a prior art brake control valve for use in freight car brake equipment;

FIG. 3 is a schematic view of a valve for maintaining brake cylinder pressure in accordance with one embodiment of the present disclosure;

FIG. 4 is a schematic view of a valve for maintaining brake cylinder pressure in accordance with another embodiment of the present disclosure;

FIG. 5 is a schematic view of a valve for maintaining brake cylinder pressure in accordance with another embodiment of the present disclosure; and FIG. 6 is a schematic view of a valve for maintaining brake cylinder pressure in accordance with another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", "fifth", "sixth", etc. may be used interchangeably to distinguish one component from another and are not intended to signify location or importance of the components individually or relative to other components.

FIG. 1 provides a schematic representation of a brake system associated with a prior art freight or rail car 100. The system may be used to operate air brakes (not shown) in accordance with known embodiments of the prior art. As illustrated, and referring also to FIG. 2, the freight car brake equipment includes a brake control valve 102 having a service portion 104 and an emergency portion 106 connected to a pipe bracket 108. A cut-off cock 110 connects, through a branch pipe tee 112, brake pipe 114 to the pipe bracket 108 at a brake pipe port. A retaining valve 116 connected to exhaust is connected to pipe bracket 108 at a retainer port. A combined reservoir 118, having an auxiliary reservoir portion 130 and an emergency reservoir portion 132 is connected to respective ports of pipe bracket 108. A brake cylinder 120 may be connected, such as through an empty/load device (not shown), to a brake cylinder port. The elements described so far are part of normal freight car brake equipment. The service portion 104, emergency portion 106, and pipe bracket 108 are standard parts of a control valve, for example, a DB-60 control valve from New York Air Brake LLC or Knorr Bremse AG or a similar control valve from Faiveley Transport or an ABD/ABDW/ABDX or other AAR approved brake control valve.

Air used to operate the brakes on rail cars may be transmitted through brake pipe 114 to brake control valve 102, and may accumulate in combined reservoir 118 and the portions 130, 132 thereof. Brake pipe 114 may be coupled with corresponding brake pipes in attached rail cars (not shown) through AAR standard air brake hoses 122 to form a train line operable to communicate air from an associated locomotive (not shown) to each rail car 100 attached to the locomotive as part of a train. Brake pipe 114 may serve at least two purposes. First, air may travel through brake pipe 114 to accumulate in combined reservoir 118 for each individual rail car 100. Second, brake pipe 114 may facilitate transmission of a pressure drop that activates respective brakes associated with each rail car 100.

In general, the brake cylinder pressure maintaining valves in accordance with the present disclosure may be included in any suitable brake control valve and service portion thereof. Thus, the invention may be used in the DB-60 control valve or other AAR-styled brake control valves or non-AAR brake control valves, including ABD/ABDW/ABDX-type control valves.

Pipe bracket 108 supports and aligns both service 104 and emergency 106 portions and supplies air to the valvular components. The precontrolled flow of air to and from the brake pipe 114, brake cylinder 120, combined auxiliary/emergency reservoir 118 and retaining valve 116 is also directed through the pipe bracket 108 to which all connections are made, with butt or socket welded flange fittings.

The specific functions of the service portion 104 are to supply air to the combined reservoir 118 during initial charging of the system and recharging following release of an application; to direct auxiliary reservoir AR air into the brake cylinder 120 depending on a predetermined rate and amount of brake pipe pressure reduction; to exhaust brake cylinder BC air during release after an application; to guarantee stability of the brake system in release condition against undesired application of the brakes which may result from permissible brake system leakage; and to guarantee stability of the brake system in service lap condition against undesired release of the brakes which may result from permissible auxiliary reservoir leakage.

The service portion 104 also functions to support recharge of the brake system during the release of a service application by feeding emergency reservoir ER air into the brake pipe 114 independent from the main piston system; to guarantee minimum reduction during initial brake pipe reduction and maintain minimum brake cylinder BC pressure by connecting quick service chamber QS-Ch. and brake cylinder BC pressures; to support initial brake pipe reduction by venting brake pipe BP air to the atmosphere ATM during the preliminary quick service stage; to support recharge of the brake system after manual release subsequent to an emergency application by connecting the pressure of the auxiliary reservoir to the brake pipe 114, to permit exhaust of retainer held brake cylinder pressure in the retainer pipe and volumes during manual release subsequent to a service reduction; to directly release brake cylinder pressure independent of the main piston system after any application by manual activation of the release handle; to provide manual drain means for auxiliary reservoir and emergency reservoir pressures; and to release the main piston system after a service application by manual activation of release handle.

FIG. 2 illustrates one embodiment of a service portion 104. As shown in FIG. 2, the service main piston 202 compares brake pipe BP and auxiliary reservoir AR pressures acting on equal areas. Auxiliary reservoir charging valve 204, emergency reservoir charging valve 206, and balancing valve 208 are spaced uniformly at 120 degree intervals around the same diameter and are mechanically operated by the bottom side of the piston. The coaxially-arranged balancing piston 210 is pressurized with auxiliary reservoir AR air by the balancing valve 208 and acts on the balancing spring 212 which stabilizes the main piston system 202 in service lap position.

The main piston 202 operates the quick service inlet valve 214, which allows brake pipe BP air to flow to the quick service chamber (QS-Ch.). The auxiliary reservoir/brake cylinder inlet 216 and brake cylinder/retainer outlet valves 218 are also mechanically operated by the main piston 202. Stability of the main piston system 202 in the release position is provided by means of the sensitivity choke 220 and stability choke 222; stability in the service lap positions is provided by means of the stability choke 222. A separate emergency reservoir charging check valve/choke 224 arrangement prevents uncontrolled return flow of emergency reservoir ER air into the auxiliary reservoir when releasing the brakes from a service application. Thus, no undesired reapplication of the brakes will occur during release.

A metal-reinforced rubber diaphragm 225 of the service accelerated release valve 226 also compares brake pipe BP and auxiliary reservoir AR pressures acting on equal areas. This component operates independently of the service main piston system 202. When the service accelerated release valve 226 is triggered, emergency reservoir ER air passes by the high sensitivity back flow check valve 228 into the brake pipe BP.

A metal-reinforced rubber diaphragm 233 of the quick service limiting valve 230 is pressurized by brake cylinder BC air and allows restricted flow of brake pipe/quick service air to the brake cylinder 118 to a predetermined value. The quick service limiting check valve 232 prevents return flow of brake cylinder BC air to atmosphere ATM during emergency applications and in the event of a retainer is being set in "high pressure retaining" position with the service main piston system 202 in the release position.

A metal-reinforced rubber diaphragm 233 of the emergency release auxiliary reservoir reduction valve 234 is pressurized by brake pipe and brake cylinder air in opposite sides. After manual release of brake cylinder pressure subsequent to an emergency application, increasing brake pipe pressure during recharging operates the valve and allows auxiliary reservoir air to flow via the emergency release auxiliary reservoir reduction check valve 234 into the brake pipe and assists during brake pipe recharging. The retaining check valve 236, by means of a choke, allows reduction of retainer held brake cylinder air to a pressure level which allows the brake cylinder piston to move to release position.

The quick service valve 238 piston is pressurized by auxiliary reservoir AR air on one side and controls the flow of quick service QS air to atmosphere ATM. As soon as the service main piston system 202 allows the balancing valve 208 to pressurize the larger opposite area of the quick service valve piston with auxiliary reservoir air, the venting of quick service/brake pipe air will be interrupted. The piston of release valve 240 is pressurized on both sides with brake cylinder BC air and seals the connection from brake cylinder 120 to atmosphere ATM.

Upon activation of the release valve handle 242, the upper side of the piston is vented through the release exhaust valve 244 which allows the piston to open the passage from brake cylinder 120 to atmosphere ATM. The piston remains in this position until brake cylinder lockup pressure below the piston is released by the service main piston system 202 upon its release. Auxiliary reservoir exhaust 246 and emergency reservoir exhaust 248 valves are mechanically operated by the release valve lifter 250 and allow high capacity flow of auxiliary reservoir/emergency reservoir air to the atmosphere in order to drain the brake system.

Referring now to FIG. 3, one embodiment of a valve 300 for maintaining brake cylinder pressure is provided. Valve 300 generally replaces the quick service limiting valve 230 and components thereof. The valve may include differential relay components include diaphragms or pistons of different surface areas to produce an output that is different than the input or control. In the case of the differential relay that will be described herein below, the area ratio between the input diaphragm and the output diaphragm may be from 1:1 to 4:1, in some embodiments from 2:1 to 4:1, in some embodiments from 1:1 to 1.6:1, in some embodiments from 1:1 to 1.4:1, in some embodiments from 1.2:1 to 1.3:1. This differential relay will match the calibration of the braking system regardless of the initial level of brake pipe charging, provided the braking system has been calibrated per current AAR equalization requirements.

As illustrated, valve 300 may include a first input diaphragm 302 and a second output diaphragm 304. The first diaphragm defines a first side 310 and a second side 312. The second diaphragm 304 defines a first side 314 and a second side 316. As discussed, in exemplary embodiments, a ratio of a surface area of the first diaphragm 302 to a surface area of the second diaphragm 304 is from 1:1 to 4:1, in some embodiments from 2:1 to 4:1, in some embodiments from 1:1 to 1.6:1, in some embodiments from 1:1 to 1.4:1, in some embodiments from 1.2:1 to 1.3:1. A first port 320 is defined for receiving pressure from the emergency reservoir ER or from a control volume defined in the valve, as discussed herein. The first port 320 is in fluid communication with the first side 310 of the first diaphragm. A second port 322 is defined for receiving pressure from the brake pipe BP. The second port 322 is in fluid communication with the second side 312 of the first diaphragm. A third port 324 is defined for receiving pressure from the brake cylinder BC. The third port 324 is in fluid communication with the second side 316 of the second diaphragm 304.

As illustrated, the second side 312 and the first side 314 are generally partitioned from each other and thus not in fluid communication with each other. An exhaust port 326 may be defined for exhausting pressure from the valve 300 and control valve 102 generally. The exhaust port 326 may be in fluid communication with the first side 314 of the second diaphragm 304.

Further, a fourth port 328 may be defined for receiving pressure from a quick service volume QSV, such as the quick service chamber QS-Ch. Quick service volume QSV may be charged by brake pipe pressure BP. The fourth port 328 may be in fluid communication, such as selective fluid communication via operation of check valves as discussed herein, with the second side 316 of the second diaphragm 304. Fourth port 328 may further be a choke, thus limiting the flow of air therethrough.

Further, valve 300 may include various pistons connected to the diaphragms. A first piston 332 may be coupled to the first diaphragm 302, and a second piston 334 may be coupled to the second diaphragm 304. A stem 333 of the first piston 332 may extend into the second side 312, and may further extend through the seal to the first side 314. Stem 333 may be sized to, in at least some positions, contact the second piston 334 or a stem 335 thereof. Stem 335 may, for example, extend into the first side 314. Contact between the stems 333, 335 may occur in first side 314. Alternatively, stem 335 may extend through the seal to the second side 312, wherein contact may occur. Stem 335 may further extend into second side 316 as illustrated.

Various check valves and biasing elements, such as springs as illustrated, may additionally be included. For example, a first biasing element 342 may be configured to bias the second piston 334 towards the second side 316. The first biasing element 342 may, for example, be a compression spring disposed in the first side 314. A first check valve 352 and a second check valve 354 may be provided in the valve 300, and may provide selective fluid communication between the fourth port 328 and second side 316. First check valve 352 may be configured to close when the second piston 334 is moved to a first position towards the first side 314 (thus preventing flow therepast to the second side 316) and open when the second piston 334 is moved to a second position towards the second side 316 (thus allowing flow therepast to the second side 316). Second check valve 354 may be configured to close (thus preventing flow therepast from fourth port 328) when the pressure from the quick service volume QSV through fourth port 328 is zero and/or below a predetermined pressure level, and open (thus allowing flow therepast from fourth port 328) when the pressure from the quick service volume QSV through fourth port 328 is above zero and/or above a predetermined pressure level. A second biasing element 344 may bias the first and second check valves 352, 354 towards their closed positions. Second biasing element 344 may, for example, be a compression spring disposed between the check valves 352, 354.

Release and Charging Position

One embodiment of operation of the valve in various operating states of the control valve 102 is described below. Valve 300 may be controlled by the balance of pressure between the emergency reservoir (ER), brake pipe (BP), and brake cylinder (BC). With the service portion 104 in the release and charging position, the emergency reservoir is charged from the auxiliary reservoir, and the brake cylinder BC and quick service volume QS-Ch. pressures will be exhausted to zero. With brake pipe BP pressure higher than emergency reservoir ER or control chamber pressure, first diaphragm 302 will be positioned in the release or lap position towards the first side 310. In this position, piston stem 335 will be lifted by the force of biasing element 344 allowing check valve 352 to close. With the quick service volume QSV exhausted to zero, check valve 354 will be allowed to close. When the service portion 104 has fully charged, there will not be an imbalance across diaphragm 302. The service portion 104 will, as a result, remain in the charging lap position.

Service Brake Application

To initiate a brake application pressure in the brake pipe BP must be reduced below auxiliary reservoir AR pressure at service portion 104. When brake pipe BP pressure has been reduced a sufficient amount (e.g., approximately ½ psi), the first or preliminary stage of service will be initiated. During this first stage of service, brake pipe BP pressure may be reduced locally at each car by allowing it to charge the quick service volume QS-Ch., which will stay connected and charged to the level of brake pipe BP pressure for the duration of the service brake application. It is this pressure that may be used to replenish any brake cylinder BC pressure that leaks off during the duration of the service brake application.

Operation of the Differential Relay Type Brake Cylinder Maintaining Valve

With the brake system fully charged, the pressures in the emergency reservoir ER and brake pipe BP are equal and the force across control diaphragm 302 is balanced. When brake pipe BP pressure is reduced to initiate a service brake application, emergency reservoir ER pressure remains constant at its fully charged level during a service brake application, and may be used as a reference or control pressure for the valve 300. As brake pipe BP pressure is reduced below emergency reservoir ER pressure, a differential of force is established across the control diaphragm 302. This, in turn, causes the control diaphragm 302, piston 332, diaphragm 304, piston 334, and check valve 352 to move against biasing element 344. As a result, biasing element 344 is compressed and opens check valve 352. With QSV pressure present at the fourth port 328, check valve 354 will be opened by the pressure differential between QSV and brake cylinder BC pressures, allowing QSV pressure (i.e. from brake pipe BP) to flow through the third port 324 to the brake cylinder 120.

As brake cylinder BC pressure increases, pressure also increases across the surface of diaphragm 304, which develops an opposing force to the force being exerted by the diaphragm 302. When the two forces are approximately balanced, the force on diaphragm 304 will move piston 332 and diaphragm 302 away from check valve 352, i.e. towards first side 310. At the same time, the force of biasing element 344 will force check valve 352 and stem 335 toward the diaphragm 302. Check valve 352 will then close, cutting off the flow of air from QSV to brake cylinder 120. Under these conditions, the service portion 104 control stack and the valve 300 are both in lap position, bottling brake cylinder BC pressure at the existing state of charge.

As discussed, the surface area differential ratio between diaphragm 302 and diaphragm 304 may be from 1:1 to 4:1, in some embodiments from 2:1 to 4:1, in some embodiments from 1:1 to 1.6:1, in some embodiments from 1:1 to 1.4:1, in some embodiments from 1.2:1 to 1.3:1. This will theoretically result in, for example, an increase of 3 psi for every 1 psi that brake pipe BP pressure is reduced below emergency reservoir ER pressure. By using a fixed ratio valve 300 in conjunction with a conventional pneumatic brake system calibrated to AAR requirements, a single configuration will perform properly regardless of initial system charge (i.e., the slope of the brake cylinder BC pressure build up curve will be correct for a 70, 80, 90 psi, or any other system operating pressure).

In the event brake cylinder BC pressure is reduced as a result of leakage, the force across diaphragm 304 is reduced such that the diaphragm 302 will move piston 332, diaphragm 304, stem 335 and check valve 352 against biasing element 344, compressing it and opening check valve 352. With QSV pressure above zero at the fourth port 328, check valve 354 will open due to the pressure differential between QSV (i.e. from brake pipe BP) and brake cylinder BC, allowing QSV pressure to flow to brake cylinder 120, replenishing it to its original level of charge. When the force balance has been reestablished, the valve 300 will move to lap position, cutting off the flow of brake pipe BP air to brake cylinder 120. Under these conditions, the service portion 104 control stack (which never moved out of lap position) and the valve 300 are both in lap position, bottling brake cylinder BC pressure at the existing state of charge.

In the event of an over reduction of brake pipe BP pressure, the level of brake cylinder BC pressure will only be maintained to the level of brake pipe BP pressure. This is in contrast to current brake cylinder limiting valves, which under service braking conditions can only maintain brake cylinder pressure at nominally 10 psi.

In the event of an emergency brake application, the quick service volume QSV will be vented to zero and check valve 354 will be closed, terminating brake cylinder pressure maintenance. During a release of the brakes, brake pipe BP pressure is reestablished to its original pressure setting, causing the service portion 104 to move to release and charging position. In this position, emergency reservoir ER pressure will be recharged to brake pipe BP pressure, and brake cylinder BC pressure will be exhausted to zero, returning the valve 300 to the conditions described under release and charging above.

FIG. 4 illustrates another embodiment of valve 300. In this embodiment, a passage 360 is defined in and extends through stem 335. An inlet 362 of the passage 360 is disposed on the second side 316, and an outlet 364 is disposed on the first side 314 (although it should be understood that air may flow both into and out of inlet 362 and outlet 364, depending on the direction of flow). Inlet 362 may be closed when the first check valve 352 contacts the stem 335 and open when the first check valve 352 is spaced from the stem 335.

In some cases during operation, brake cylinder pressure BC may rise. Such rise may, for example, be due to a leakage in valve 300 or in another component through which pressure is supplied to the brake cylinder 120. If brake cylinder pressure BC rises sufficiently, pressure from the third port 324 may move the first check valve 352 away from the stem 335. The excess brake cylinder pressure BC may flow through the passage 360 to the first side 314, and then through exhaust port 326 to be exhausted. When sufficient pressure has been exhausted, check valve 352 may close against stem 335, cutting off access of the brake cylinder pressure BC to the passage 360 and thus bottling the brake cylinder pressure BC.

FIG. 5 illustrates another embodiment of valve 300. In this embodiment, a third check valve 372 may be provided and disposed between the third port 324 and the second side 316. The third check valve 372 may be configured to allow flow from the second side 316 therepast to and through the third port 324 by opening due to sufficient pressure from the second side 316 and prevent flow from the third port 324 therepast to the second side 316 by closing due to sufficient pressure that is not overcome by pressure on the second side 316. Further, in exemplary embodiments, a third biasing element 374 may bias the check valve 372 towards the closed position.

In some cases during operation, brake cylinder pressure BC may rise. Such rise may, for example, be due to a leakage in valve 300 or in another component through which pressure is supplied to the brake cylinder 120. Flow to the brake cylinder 120 through third port 324 may flow from second side 316 through check valve 372, which may move to the open position due to the pressure on the second side 316 overcoming the BC pressure through third port 324 and the bias of the biasing element 374. If brake cylinder pressure BC rises sufficiently, the check valve 372 may close due to the BC pressure and bias overcoming the pressure on the second side 316, thus preventing overpressurization of the brake cylinder 120.

As discussed, in some embodiments first port 320 receives pressure from the emergency reservoir, while in other embodiments the first port 320 receives pressure from a control volume. FIGS. 3 through 5 illustrate embodiments wherein first port 320 receives pressure from the emergency reservoir. Referring now to FIG. 6, in this embodiment, first port 320 may receive pressure from a control volume 380. In the embodiment shown, valve 300 may include a fifth port 382, a sixth port 384 and an exhaust port 386. Fifth port 382 may receive pressure from the emergency reservoir 132, while sixth port 384 receives pressure from the brake pipe 114. Further, valve 300 may include a fourth check valve 392 and a fifth check valve 394.

Fourth check valve 392 may be disposed between the first port 320 (which receives pressure from the control volume 380) and the fifth port 382. A diaphragm 393 may be connected to check valve 392, and may prevent flow between the first port 320 and fifth port 382. Fourth check valve 392 may be configured to open when pressure from the first port 320 is greater than pressure from the fifth port 382, such as at a predetermined level greater than pressure from the fifth port 382. In some embodiments, a fourth biasing element 396 may bias the check valve 392 towards a closed position, such that the pressure from the first port 320 must overcome the pressure from the fifth port 382 and this bias to open the check valve 392. Fourth check valve 392 may further be configured to close when pressure from the first port 320 is less than pressure from the fifth port 382 or a predetermined level, i.e. the pressure from the fifth port 382 plus the biasing force. When the fourth check valve 392 is open, the first port 320 and exhaust port 386 may be in fluid communication. When the fourth valve 392 is closed, communication between the first port 320 and exhaust port 386 may be prevented.

Fifth check valve 394 may be disposed between the first port 320 and the sixth port 384. Fifth check valve 394 may be configured to allow flow from the sixth port 384 therepast to the first port 320 by opening due to sufficient pressure from the sixth port 384 and prevent flow from the first port 320 therepast to the sixth port 384 by closing due to sufficient pressure from the first port 320 that is not overcome my pressure from the sixth port 384. Further, in exemplary embodiments, a fifth biasing element 398 may bias the check valve 394 towards the closed position.

Pressure may be bottled in the control volume 380 for use with valve 300 from, for example, brake pipe pressure BP through the sixth port 384 and past the fifth check valve 394. One concern during operation is the ability to vent brake pipe pressure BP during or after an emergency application. Accordingly, when an emergency application occurs and emergency reservoir pressure ER thus drops below a sufficient threshold, check valve 392 may open, allowing bottled brake pipe pressure from control volume 380 to vent through exhaust port 386. Further, brake pipe pressure through sixth port 384 may, when control volume 380 pressure is at a sufficient level below the level in the sixth port 384, open check valve 394, thus allowing further venting of brake pipe pressure BP through exhaust port 386.

Under conditions where the brake cylinder BC pressure is low due to long piston travel or other causes, the valve 300 will supplement the standard system to bring brake cylinder BC pressure into the proper operating range. The valve 300 is self-calibrating, and does not rely on the proper setting of a spring to develop the proper out put pressure. It is functional throughout the full service application range. This is unlike many designs according to the prior art, which are only effective at brake cylinder BC pressure of approximately 10 psi. Moreover, this feature can be added to many existing control valves, such as the DB-60 and/or ABD/ABDW/ABDX configurations, with little modification to the control valve body and cover.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A freight car brake system, comprising:
a brake pipe;
an auxiliary reservoir;
an emergency reservoir;

a brake cylinder; and
a brake control valve connected to the brake pipe, the auxiliary reservoir, the emergency reservoir, and the brake cylinder, the brake control valve comprising a valve for maintaining brake cylinder pressure, the valve comprising:
  a first diaphragm defining a first side and a second side;
  a second diaphragm defining a first side and a second side;
  a first port for receiving pressure from one of the emergency reservoir or a control volume, the first port in fluid communication with the first side of the first diaphragm;
  a second port for receiving pressure from the brake pipe, the second port in fluid communication with the second side of the first diaphragm;
  a third port for receiving pressure from the brake cylinder, the third port in fluid communication with the second side of second diaphragm;
  a piston coupled to the second diaphragm, the piston comprising a stem extending into the second side of the second diaphragm; and
  a biasing element disposed in the first side defined by the second diaphragm, the biasing element configured to bias the piston towards the second side of the second diaphragm.

2. The system of claim 1, further comprising a fourth port for receiving pressure from a quick service volume, the quick service volume charged by a brake pipe, the fourth port in fluid communication with the second side of the second diaphragm.

3. The system of claim 2, further comprising:
a first check valve configured to close when the piston is moved to a first position towards the first side of the second diaphragm and open when the piston is moved to a second position towards the second side of the second diaphragm; and
a second check valve configured to close when the pressure from the quick service volume is below a predetermined pressure level.

4. The system of claim 3, further comprising a passage defined in and extending through the stem of the piston, the passage comprising an inlet on the second side of the second diaphragm and an outlet on the first side of the second diaphragm, and wherein the inlet is closed when the first check valve is in contact with the stem and open when the first check valve is spaced from the stem.

5. The system of claim 4, further comprising an exhaust port in fluid communication with the first side of the second diaphragm.

6. The system of claim 3, further comprising a third check valve disposed between the third port and the second side of the second diaphragm, the third check valve configured to allow flow from the second side of the second diaphragm to the third port and prevent flow from the third port to the second side of the second diaphragm.

7. The system of claim 3, wherein the first port receives pressure from the emergency reservoir.

8. The system of claim 3, wherein the first port receives pressure from the control volume.

9. The system of claim 8, further comprising:
a fifth port for receiving pressure from the emergency reservoir;
a sixth port for receiving pressure from the brake pipe;
an exhaust port;
a fourth check valve disposed between the first port and the fifth port, the fourth check valve configured to open when pressure from the first port is at a predetermined level greater than pressure from the fifth port, and wherein the first port and exhaust port are in fluid communication when the fourth check valve is open; and
a fifth check valve disposed between the first port and the sixth port, the fifth check valve configured to allow flow from the sixth port to the first port and prevent flow from the first port to the sixth port.

10. The system of claim 3, wherein the biasing element is a first biasing element, and further comprising a second biasing element disposed between the first check valve and the second check valve, the second biasing element configured to bias the first check valve and second check valve towards closed positions.

11. The system of claim 1, wherein the second side of the first diaphragm and the first side of the second diaphragm are partitioned from each other.

12. The system of claim 1, wherein a surface area differential between the first diaphragm and the second diaphragm is from 1:1 to 4:1.

13. A freight car brake system, comprising:
a brake pipe;
an auxiliary reservoir;
an emergency reservoir;
a brake cylinder; and
a brake control valve connected to the brake pipe, the auxiliary reservoir, the emergency reservoir, and the brake cylinder, the brake control valve comprising a valve for maintaining brake cylinder pressure, the valve comprising:
  a first diaphragm defining a first side and a second side;
  a second diaphragm defining a first side and a second side;
  a first port for receiving pressure from one of the emergency reservoir or a control volume, the first port in fluid communication with the first side of the first diaphragm;
  a second port for receiving pressure from the brake pipe, the second port in fluid communication with the second side of the first diaphragm;
  a third port for receiving pressure from the brake cylinder, the third port in fluid communication with the second side of the second diaphragm;
  a first check valve movable between a closed position and an open position;
  a second check valve movable between a closed position and an open position; and,
  a biasing element disposed between the first check valve and the second check valve, the biasing element configured to bias the first check valve and second check valve towards closed positions.

14. The system of claim 13, further comprising a fourth port for receiving pressure from a quick service volume, the quick service volume charged by a brake pipe, the fourth port in fluid communication with the second side of the second diaphragm.

15. The system of claim 13, wherein the biasing element is a second biasing element, and further comprising:
a piston coupled to the second diaphragm, the piston comprising a stem extending into the second side of the second diaphragm; and
a first biasing element configured to bias the piston towards the second side of the second diaphragm,
wherein the first check valve is configured to close when the piston is moved to a first position towards the first side of the second diaphragm and open when the piston is moved to a second position towards the second side of the second diaphragm,
wherein the second check valve is configured to close when the pressure from the quick service volume is below a predetermined pressure level.

16. The system of claim 15, further comprising a passage defined in and extending through the stem of the piston, the passage comprising an inlet on the second side of the second diaphragm and an outlet on the first side of the second diaphragm, and wherein the inlet is closed when the first check valve is in contact with the stem and open when the first check valve is spaced from the stem.

17. The system of claim 16, further comprising an exhaust port in fluid communication with the first side of the second diaphragm.

18. The system of claim 15, further comprising a third check valve disposed between the third port and the second side of the second diaphragm, the third check valve configured to allow flow from the second side of the second diaphragm to the third port and prevent flow from the third port to the second side of the second diaphragm.

19. The system of claim 15, wherein the first port receives pressure from the emergency reservoir.

20. The system of claim 15, wherein the first port receives pressure from the control volume.

21. The system of claim 20, further comprising:
a fifth port for receiving pressure from the emergency reservoir;
a sixth port for receiving pressure from the brake pipe;
an exhaust port;
a fourth check valve disposed between the first port and the fifth port, the fourth check valve configured to open when pressure from the first port is at a predetermined level greater than pressure from the fifth port, and wherein the first port and exhaust port are in fluid communication when the fourth check valve is open; and
a fifth check valve disposed between the first port and the sixth port, the fifth check valve configured to allow flow from the sixth port to the first port and prevent flow from the first port to the sixth port.

* * * * *